2,965,784
Patented Dec. 20, 1960

2,965,784

ELECTROLUMINESCENT VITREOUS ENAMEL AND LAMP

Lewis C. Hoffman, Scotch Plains, N.J., assignor to E. I. du Pont de Nemours and Company, Wilmington, Del., a corporation of Delaware No Drawing. Filed Jan. 15, 1959, Ser. No. 786,915

7 Claims. (Cl. 313—108)

This invention relates to an electroluminescent vitreous enamel and, more particularly, it relates to a mixture of a vitreous frit or enamel and an electroluminescent phosphor.

Electroluminescent lamps are commonly constructed by embedding an electroluminescent phosphor in a dielectric material between two electrodes. One of these electrodes should, of course, transmit light and the other may be opaque. In one known construction for such lamps a vitreous enamel layer is used as the dielectric in which the phosphor is embedded and the enamel is fired on a metal substrate functioning as one of the electrodes. The other electrode is commonly a conductive light-transmitting layer of tin oxide on the opposite side of the enamel layer.

The frit or enamel used for embedding the phosphor should have a high dielectric constant and should not interact with the phosphor during the firing operation or in later use.

Although the particular phosphor used constitutes no part of this invention, many useful phosphors are known, e.g. ZnS, with or without ZnO or ZnSe, and if desired activated with small amounts of Cu, Pb, Mn, As or certain metal chlorides.

Enamel frits heretofore used in combination with electroluminescent phosphors have not been fully satisfactory. In some cases such frits reacted with the phosphor during the formulation or firing of the frit and in other cases the heat of firing the frit caused a material degradation of the phosphor.

It is an object of this invention to provide a new and improved combination of enamel frit and phosphor.

It is another object to provide a method of producing electroluminescent lamps by firing a mixture of phosphor and frit on a metal substrate to produce a lamp of superior electroluminescence.

Other objects of this invention will appear hereinafter.

The objects of this invention may be accomplished in general by admixing an electroluminescent phosphor with an enamel frit having a relatively low melting point and a relatively high chemical resistance. An enamel frit that can be suitably bonded to a metal substrate of the class consisting of aluminum, aluminum alloys, austenitic stainless steel, or copper, must contain:

| | Mol percent | | Mol percent |
|---|---|---|---|
| $SiO_2$ | 17–33 | $Sb_2O_3$ | 0– 1 |
| $TiO_2$ | 20–30 | BaO | 0–10 |
| $Na_2O$ | 24–29 | CaO | 0– 3 |
| $Li_2O$ | 3– 5 | $ZrO_2$ | 0– 2 |
| $K_2O$ | 3– 9 | ZnO | 0– 2 |
| $B_2O_3$ | 0–11 | | | at least 85% of the frit must consist of the above constituents, said frit containing less than 100 p.p.m. of NiO, $Fe_2O_3$, MnO, CoO or PtO. The total $R_2O$ ($Na_2O$, $Li_2O$ and $K_2O$) being between 35 and 38 mol percent and the ratio $$\frac{SiO_2+2TiO_2}{R_2O}=2.0 \text{ to } 2.2$$

and an enamel frit that can be suitably bonded to a steel ground coat enamel must contain:

| | Mol percent | | Mol percent |
|---|---|---|---|
| $SiO_2$ | 26–30 | $K_2O$ | 2– 5 |
| $B_2O_3$ | 10–23 | BaO | 0– 6 |
| $TiO_2$ | 12–21 | $Sb_2O_3$ | 0– 1 |
| $Na_2O$ | 17–22 | ZnO | 0– 9 |
| $Li_2O$ | 8–11 | $F_2$ | 0– 5 | at least 85% of the frit must consist of the above constituents, said frit containing less than 100 p.p.m. of NiO, $Fe_2O_3$, $MnO_2$, CoO or PtO, the total $R_2O$ ($Na_2O$, $Li_2O$ and $K_2O$) being between 32 and 35 mol percent and the ratio $$\frac{SiO_2+2TiO_2}{R_2O}=1.7 \text{ to } 2.2$$

Several of the melted in constituents of the frit contribute to phosphor brightness and low voltage threshold of activity. $TiO_2$ gives high dielectric constant with the result that the electric field tends to concentrate in the phosphor. This gives a higher effective voltage gradient across phosphor grains and thus lower threshold and greater brightness. Melted in ZnO in small amounts seems to contribute to brightness probably by minimizing dissolution of the desired cubic, crystalline phosphor in the frit with resultant loss of electroluminescent properties. Melted in antimony also seems to stabilize the ZnS, probably by acting as a reducing agent during firing and preventing the formation of ZnO which is less electroluminescent than ZnS.

Another requirement is that the frit be substantially free of certain phosphor poisons. The presence of certain heavy metals, particularly Ni, Mn, Fe, Co and Pt in amounts far below that required for visible color can quench the electroluminescence of a good phosphor. The frit raw materials must all be chosen to contain less than 100 p.p.m. of any of these five heavy metals. It was found that the use of grades of chemicals referred to as "chemically pure" or c.p. was required, with one exception. $SiO_2$ could be batched from "potter's flint" even though flint is known to contain traces of iron. The use of sands with higher iron content than potter's flint was shown to give extensive phosphor degradation.

The need for freedom from trace impurities makes it preferable to rule out the use of platinum containers for melting the frit. Best results are obtained by melting the frit in a good grade of fireclay. What pertains to the frit is also pertinent to the other components of the system and the processing equipment.

Where a phosphor-frit combination is to be fired on aluminum, austenitic stainless steel or copper it is usually desired to add to the frit an anti-tearing agent composed of an alkali metal silicate-alkali metal metaborate mixture as described and claimed in Deyrup Patent No. 2,653,877. Such addition agent must also be made from c.p. chemicals, or the equivalent, to avoid phosphor degradation.

It was found, in the application of phosphor-frit mixtures to metal substrates, that the choice of the phosphor-embedding frit is dependent upon the metal substrate to be used for the phosphor-frit layer. The aluminum, austenitic stainless steel and copper require a frit as above described, whereas if it is desired to use a steel, iron or non-austenitic stainless steel it is necessary to use two frits. A conventional steel enamel such as a cobalt, nickel, manganese bearing ground coat for adequate adherence is first fired on such metal, and a cover coat of the phosphor-frit is applied and fired over the ground coat. If austenitic stainless steel is used, it is desirable to first treat the same with sulfuric acid. This may be done by contacting the austenitic stainless steel, i.e., 18–8 Cr-Ni stainless steel, with a 5–50% by weight aqueous solution of sulfuric acid for a period of 1 to 60 minutes. This steel may also be prepared for enamelling by sand-blasting.

The phosphor particles may be mixed with the dry enamel frit to produce a mixed dry product that can be later mixed with a vehicle to prepare the mixture for application to a substrate. Any air dry vehicle commonly used with enamel frits such as pine oil, terpenes, alcohols or even water may be used. If desired the vehicle may be a thermofluid material such as disclosed in Jessen Patents Nos. 2,607,701 and 2,607,702, or Andrews Patent No. 2,682,480. It has been found that a weight ratio of between 65 and 80% by weight of phosphor with between 35 and 20% by weight of frit will produce lamps giving optimum brightness and length of life.

The following table illustrates the brightness in foot-lamberts obtained with aluminum substrate lamps using a frit containing the following composition, in mol percent; $SiO_2$—32.3, $B_2O_3$—1.7, $TiO_2$—22.5, $Na_2O$—25.7, $K_2O$—8.1, $Li_2O$—4.1, $Sb_2O_3$—0.4, $BaO$—5.2, and using a phosphor composed of ZnS activated with Cu, Pb, and As which gives 3.0 foot-lamberts of brightness as an organic bonded lamp at 100 volts/mil and 12,000 cycles.

TABLE 1

| Percent Phosphor | 60 cycles, foot-lamberts | 6,000 cycles, foot-lamberts | 12,000 cycles, foot-lamberts |
| --- | --- | --- | --- |
| 90 | 0.00 | breakdown | breakdown. |
| 85 | 0.01 | do | Do. |
| 80 | 0.03 | 1.10 | Do. |
| 75 | 0.20 | 1.00 | 2.40. |
| 70 | 0.15 | 0.85 | 2.00. |
| 65 | 0.20 | 1.10 | 1.12. |
| 60 | 0.04 | 0.90 | 1.05. |
| 55 | 0.01 | 0.30 | 0.85. |
| 50 | 0.000 | 0.10 | 0.40. |

It is seen that phosphor contents higher than about 80 percent yield voltage breakdown (puncturing and gradual destruction of lamp by arcing) especially at higher frequencies. This is due to the porosity of the embedding layer. Below about 65 percent there is insufficient phosphor present to give optimum brightness, although special application would find these lamps useful.

When the phosphor content is so high the embedding layer will not adhere to the substrate, correction may be made by coating the substrate with a thin 0.001 inch coat of unpigmented glass. In the case of aluminum, this may be the same frit as in the embedding layer; in the case of steel, the ground coat frit will suffice. It is essential that the ground coat be fired before applying the combination layer of frit and phosphor.

A lamp, consisting of metal substrate, thin fired adherence layer and fired phosphor-enamel layer, can be caused to glow by placing a piece of SnO coated transparent conductive glass on top of the phosphor-enamel layer as the second electrode and placing in the proper electric field. The rough surface of the phosphor-enamel embedding layer make it desirable to place a layer of castor oil or other liquid dielectric between the embedding layer and the conductive glass, to prevent arcing due to varying thickness of capacitor. In the construction of completely inorganic lamps, it was found desirable to coat the phosphor-enamel layer with a transparent, thin (0.002 inch) coating of glass of the same composition as the enamel in the embedding layer. The conductive tin oxide film was formed on top of this coating layer. It was found very important that the layers be of uniform thickness to prevent an inhomogeneous effective field with uneven glow. This was best accomplished by making the enamel slips for application thin and allowing surface tension to level out protuberances.

The conductive layer formed on top of the coating layer was preferably formed by spraying $SnCl_4$ containing solutions on the coating layer while the coating layer was still hot from its firing. The formation of transparent, conductive layers of this kind is described by McMaster, U.S. 2,429,420; Lytle, U.S. 2,617,741 and U.S. 2,648,754 and Colbert et al., U.S. 2,808,351. It is necessary to obtain a fairly transparent, iridescent film of a D.C. resistance of less than 1,000 ohms per square to make a useful lamp. With the enamels of this case, this was best accomplished by use of the following solution:

| | Percent |
| --- | --- |
| $SnCl_4$ | 40 |
| Ethanol | 40 |
| Formaldehyde | 10 |
| Water | 10 |

The $SnCl_4$ is preferably anhydrous and is added slowly to the EtOH (which should be 95%, undenatured) until fuming stops. The water is then slowly added and when fuming stops the formaldehyde (neutral 36–38% $CH_2O$) is added. The solution should be clear and if it is not, the addition of water to the $SnCl_4$-ethanol was too fast, and the solution should be remade.

This solution is sprayed slowly onto the hot cover coat as it is removed from the furnace after firing. If sprayed too fast, a white reaction product forms which inhibits the formation of the desired iridescent film. If sprayed too slowly, the piece cools too fast for any reaction product to form. It is essential to observe the piece in a strong light as it is being sprayed and to obtain the iridescence in so doing. Measurement of square resistance on cooling is desirable as a check on the application.

The following Tables 2 and 3 disclose specific enamel frit compositions, in both mol percent and weight percent, suitable in accordance with this invention for combination with between 65% and 80% by weight of electroluminescent phosphors for application to a substrate of aluminum, aluminum alloys, austenitic stainless steel and copper.

TABLE 2

| Frit No. | Mol Percent | | | | | |
| --- | --- | --- | --- | --- | --- | --- |
| | 1 | 2 | 3 | 4 | 5 | 6 |
| $SiO_2$ | 32.3 | 28.0 | 30.0 | 30.0 | 29.0 | 17.8 |
| $B_2O_3$ | 1.7 | 6.7 | 7.0 | 10.4 | | 10.2 |
| $TiO_2$ | 22.5 | 23.6 | 24.6 | 20.2 | 24.4 | 29.2 |
| $Na_2O$ | 25.7 | 24.2 | 26.9 | 28.2 | 26.4 | 25.4 |
| $K_2O$ | 8.1 | 7.4 | 7.0 | 3.7 | 7.0 | 5.7 |
| $Li_2O$ | 4.1 | 3.8 | 4.1 | 3.8 | 4.0 | 4.6 |
| $Sb_2O_3$ | 0.4 | | | 0.4 | | |
| BaO | 5.2 | 4.9 | | | 9.2 | 5.3 |
| CaO | | | 1.5 | | | |
| $ZrO_2$ | | | | 2.4 | | |
| ZnO | | | | 1.3 | | |
| $SiO_2+2TiO_2$ | | | | | | 1.8 |
| $R_2O$ | 2.04 | 2.12 | 2.08 | 2.00 | 2.08 | 2.13 |

TABLE 3

| Frit No. | Weight Percent | | | | | |
|---|---|---|---|---|---|---|
| | 1 | 2 | 3 | 4 | 5 | 6 |
| $SiO_2$ | 26.7 | 23.4 | 26.0 | 27.0 | 23.2 | 14.6 |
| $B_2O_3$ | 1.7 | 6.5 | 7.2 | 11.0 | | 9.7 |
| $TiO_2$ | 24.8 | 26.2 | 29.1 | 24.3 | 26.0 | 31.9 |
| $Na_2O$ | 22.0 | 20.9 | 24.4 | 26.5 | 21.9 | 21.5 |
| $K_2O$ | 10.4 | 9.7 | 9.7 | 5.2 | 8.7 | 7.3 |
| $Li_2O$ | 1.7 | 1.6 | 1.8 | 1.7 | 1.4 | 1.9 |
| $Sb_2O_3$ | 1.7 | | 1.8 | | | |
| BaO | 11.0 | 10.4 | | | 18.7 | 11.1 |
| CaO | | 1.2 | | 2.0 | | |
| $ZrO_2$ | | | | 2.3 | | |
| ZnO | | | | | | 2.0 |

The following Tables 4 and 5 disclose specific enamel frit compositions, in both mol percent and weight percent, suitable for combination with between 65% and 80% by weight of electroluminescent phosphors for application to a substrate of steel, iron or non-austenitic stainless steel covered with a ground coat of a steel enamel.

TABLE 4

| Frit No. | Mol Percent | | | | | |
|---|---|---|---|---|---|---|
| | 1 | 2 | 3 | 4 | 5 | 6 |
| $SiO_2$ | 27.4 | 28.1 | 27.8 | 29.4 | 28.3 | 26.9 |
| $B_2O_3$ | 14.0 | 14.4 | 22.9 | 15.1 | 14.5 | 10.1 |
| $TiO_2$ | 19.6 | 20.0 | 12.9 | 15.8 | 15.2 | 21.0 |
| $Na_2O$ | 21.1 | 17.4 | 17.6 | 19.3 | 18.5 | 19.8 |
| $K_2O$ | 4.8 | 5.0 | 2.1 | 5.2 | 5.0 | 4.8 |
| $Li_2O$ | 8.8 | 9.0 | 10.8 | 9.4 | 9.0 | 8.7 |
| BaO | 0.5 | 2.2 | 2.9 | 5.1 | 0.5 | |
| $Sb_2O_3$ | 0.7 | 0.7 | | 0.7 | 0.7 | 0.2 |
| ZnO | | | | | 8.3 | 4.0 |
| $F_2$ | 3.1 | 3.2 | 3.0 | | | 4.5 |
| $\frac{SiO_2 + 2TiO_2}{R_2O}$ | 1.92 | 2.17 | 1.76 | 1.80 | 1.81 | 2.07 |

TABLE 5

| Frit No. | Weight Percent | | | | | |
|---|---|---|---|---|---|---|
| | 1 | 2 | 3 | 4 | 5 | 6 |
| $SiO_2$ | 24.8 | 24.8 | 25.8 | 25.0 | 25.0 | 24.8 |
| $B_2O_3$ | 14.9 | 14.9 | 24.8 | 15.0 | 15.0 | 10.9 |
| $TiO_2$ | 23.8 | 23.8 | 15.9 | 18.0 | 18.0 | 25.8 |
| $Na_2O$ | 19.8 | 15.9 | 16.9 | 17.0 | 17.0 | 18.9 |
| $K_2O$ | 6.9 | 6.9 | 3.0 | 7.0 | 7.0 | 6.9 |
| $Li_2O$ | 4.0 | 4.0 | 5.0 | 4.0 | 4.0 | 4.0 |
| BaO | 1.0 | 4.9 | 6.8 | 11.0 | 1.0 | |
| $Sb_2O_3$ | 3.0 | 3.0 | | 3.0 | 3.0 | 1.0 |
| ZnO | | | | | 10.0 | 5.0 |
| $F_2$ | 1.8 | 1.8 | 1.8 | | | 2.7 |

The following examples are given to illustrate certain detailed procedures and products of this invention, it being understood that these specific details are not to be considered as limitative of this invention.

*Example I*

A 4 x 6 x ⅛ inch piece of aluminum alloy 6061 after thorough cleaning in a conventional manner, e.g. dipping in hot chromic acid solution, was pretreated in 40° C. $K_2Cr_2O_7$ solution for 7 minutes, and then prefired at 540° C. for 7 minutes.

A ground coat slurry of 100 parts by weight of frit 1, Table 2, 7 parts by weight of an anti-tearing agent consisting of c.p. KOH—5%, boric acid—40% and anhydrous $Na_2SiO_3$—55% dissolved in deionized water, and 100 parts of deionized water was prepared by milling in a ball mill for 2 hours.

The ground coat slurry was sprayed onto the pre-fired aluminum alloy piece and fired at 540° C. for 7 minutes to produce a 0.001 inch thick enamel ground coat layer.

An embedding coat slurry was prepared by ball milling for 2 hours 25 parts of frit 1, Table 2, 75 parts of finely divided copper and lead activated zinc sulfide phosphor, 7 parts of the above-mentioned anti-tearing agent and 120 parts of deionized water (all parts by weight). The embedding coat slurry was applied over the enamel ground coat by spraying and allowed to dry and then fired at 540° C. for 7 minutes to produce a fired thickness of 0.003 inch.

A cover coat was sprayed over the embedding coat using the above-described ground coat slurry, and fired at 540° C. for 7 minutes to produce a fired thickness of 0.002 inch. Upon removal of the lamp from the firing furnace, a solution of 40% $SnCl_4$, 40% ethyl alcohol, 10% of a 37% aqueous formaldehyde solution and 10% deionized water (percentages by weight) is slowly sprayed onto the hot enamel surface whereby to form thereon a transparent, irridescent film. The measured resistance of said film being 300 ohms/square.

This lamp was then incorporated in a capacitative circuit by mechanical contact to the back and front electrodes. The necessary circuit was produced by feeding the output of a Hewlett Packard Model 200 CD oscillator into a McIntosh 30 watt amplifier, the output of which was fed into a 1:44 transformer which fed the lamp. The voltage was read by a suitable A.C. voltmeter across the line and brightness by a photovolt foot candle meter resting on the face of the lamp.

The lamp gave 1.5 foot-lamberts at 140 volts per 0.001" thickness at 6,000 cycles per second. The lamp was operated for 400 hours at 140 volts/mil at 6,000 cycles per second. No perceivable brightness decrease occurred during this time, thus confirming the long life of the lamp.

*Example II*

A 2 x 3 x ⅛ inch piece of Armco "enameler's iron" may be thoroughly cleaned and pretreated in any desired manner. For example, it may be cleaned in hot chromic acid containing 10% chromic acid and 5% sulfuric acid at a temperature of 75° C., after which it may be pickled in 7% sulfuric acid at 70° C. for 5 minutes, then nickel dipped in 3 ounces/gallon of $NiNH_4SO_4$ at a pH of 3 for 10 minutes at 75° C., then neutralized in 1 ounce/gallon of NaOH and prefired at 540° C. for 7 minutes. A ground coat frit slurry composed of 100 parts by weight of the following frit composition given in mol percent; $SiO_2$—27.4, $B_2O_3$—22.4, $TiO_2$—10.6, $Na_2O$—18, $K_2O$—2.1, $Li_2O$—11, BaO—2.7, $Sb_2O_3$—0.6, CoO—1.3, NiO—0.4, $MnO_2$—0.4, and $F_2$—3.1 were added to 95 parts by weight of deionized water applied to said clean enameler's iron, dried at 90° C. for 15 minutes and then fired at 540° C. for 7 minutes. The fired enamel had a thickness of 0.002 inch. The 75% by weight phosphor and 25% by weight frit coating was next applied using frit number 1 of Table 4. One hundred parts by weight of the frit was added to 120 parts water and the frit milled in a ball mill for a period of 2 hours. To the milled frit slurry was added 300 parts by weight of a phosphor consisting of lead and copper activated zinc sulfide and sufficient water to adjust the mixture to a sprayable consistency. The phosphor frit slurry was sprayed onto the ground coat to a thickness sufficient to yield a layer 0.003 inch thick after firing. The phosphor frit layer was first allowed to dry and then fired at a temperature of 540° C. for 7 minutes. A clear cover coat 0.002 inch thick was applied over the embedding layer using frit 1 of Table 4 milled for 2 hours in the proportion of 100 parts frit to 100 parts by weight of water. This slurry coat was permitted to dry and then fired at 540° C. for 7 minutes. A transparent conductive coating was applied from a $SnCl_4$ solution as described in Example I.

This lamp was tested as in Example I and gave a brightness of 3 foot-lamberts at 100 volts per thousandth of an inch thickness at 6,000 cycles per second.

In place of aluminum alloy in Example I above, austenitic stainless steel may be used with substantially the same results. Moreover, Example I may be duplicated with any of the aluminum frits set forth in Table 2 with similar results. In the event that austenitic stainless steel is substituted for aluminum as the metal substrate it is desired to pretreat the stainless steel with a 20% aqueous solution of sulfuric acid at a temperature of between 80 and 90° C. for from 3–10 minutes.

Copper may be substituted for aluminum in Example I without the necessity of any pretreatment. In the event either copper or austenitic stainless steel is substituted for the aluminum in Example I, it will be preferred to use an anti-tearing agent in accordance with the details given in Example I.

Any form of iron or non-austenitic stainless steel may be substituted for the enameler's iron of Example II using any of the frits of Table 4. The results to be obtained in the case of the above-mentioned substitutions will be substantially the same as those specifically set forth in Examples I and II.

As above-outlined, any zinc sulfide based phosphor may be used in the production of the phosphor-enamel frit compositions of the present invention. The phosphor used in the examples was the phosphor produced by the Photo Products Department of the E. I. du Pont de Nemours and Company, No. Q62-3388. The zinc sulfide based phosphors disclosed in the following patents can be used equally well in accordance with the present invention:

| | |
|---|---|
| U.S. Patent to Beutler | No. 2,755,255 |
| U.S. Patent to Prener | No. 2,731,423 |
| U.S. Patent to Butler & Davis | No. 2,728,731 |
| U.S. Patent to Butler & Burns | No. 2,802,792 |
| U.S. Patent to Leverenz | No. 2,402,757 |

In preparing the electroluminescent lamps or aluminum substrates any of the frits given in Table 2 may be used, but it is desirable to make all coats of the enamel or enamel-phosphor combinations of the same frit to avoid expansion difficulties. When using steel substrate any ground coat frit normally used as a ground coat in coating steel or iron may be used with any of the frits given in Table 4. It is not essential in the production of lamps with steel substrates to use the same frit for the embedding layer and the cover coat. The layers of frit or frit phosphor combinations may be applied by spraying, painting, brushing, or squeegeeing or in any other desired manner. Any air-dry organic vehicles normally used in the ceramic arts for the application of frit slurries or ceramic slips may be used in accordance with the present invention. As above outlined, it is also possible to use thermofluid vehicles for application of the frits to a substrate.

Since it is obvious that many changes and modifications can be made in the above-described details without departing from the nature and spirit of the invention, it is to be understood that the invention is not to be limited to said details except as set forth in the appended claims.

I claim:

1. As a new composition of matter, an electroluminescent zinc sulfide-based phosphor in admixture with a vitreous enamel frit in the proportion by weight of 65% to 80% phosphor and 35% to 20% frit, said frit being suitable to embed said phosphor and bond the same to a substrate, said frit, for use on a metal substrate from the group consisting of aluminum, aluminum alloys, austenitic stainless steel and copper comprising a total amount of at least 85 mol percent.

| | Mol percent | | Mol percent |
|---|---|---|---|
| $SiO_2$ | 17–33 | $Sb_2O_3$ | 0– 1 |
| $TiO_2$ | 20–30 | BaO | 0–10 |
| $Na_2O$ | 24–29 | CaO | 0– 3 |
| $Li_2O$ | 3– 5 | $ZrO_2$ | 0– 2 |
| $K_2O$ | 3– 9 | ZnO | 0– 2 |
| $B_2O_3$ | 0–11 | | | and containing less than 100 p.p.m. of an oxide of the group consisting of NiO, $Fe_2O_3$, MnO, CoO, and PtO and in which the total $R_2O$ ($Na_2O$, $K_2O$, and $Li_2O$) is 35–38 mol percent and the ratio $$\frac{SiO_2+2TiO_2}{R_2O}=2.0 \text{ to } 2.2$$

and said frit for use over a steel enamel ground coat substrate comprising, in a total amount of at least 85 mol percent

| | Mol percent | | Mol percent |
|---|---|---|---|
| $SiO_2$ | 26–30 | $K_2O$ | 2– 5 |
| $B_2O_3$ | 10–23 | BaO | 0– 6 |
| $TiO_2$ | 12–21 | $Sb_2O_3$ | 0– 1 |
| $Na_2O$ | 17–22 | ZnO | 0– 9 |
| $Li_2O$ | 8–11 | $F_2$ | 0– 5 | and containing less than 100 p.p.m. of an oxide of the group consisting of NiO, $Fe_2O_3$, MnO, CoO and PtO and in which the total $R_2O$ ($Na_2O$, $K_2O$, and $Li_2O$) is 32–35 mol percent and the ratio $$\frac{SiO_2+2TiO_2}{R_2O}=1.7 \text{ to } 2.2$$

2. As a new composition of matter, an electroluminescent zinc sulfide-based phosphor in admixture with a vitreous enamel frit in the proportion of 65% to 80% phosphor and 35% to 20% frit, said frit being suitable to embed said phosphor and bond the same to a metal substrate from the group consisting of aluminum, aluminum alloys, austenitic stainless steel and copper, comprising, in a total amount of at least 85 mol percent,

| | Mol percent | | Mol percent |
|---|---|---|---|
| $SiO_2$ | 17–33 | $Sb_2O_3$ | 0– 1 |
| $TiO_2$ | 20–30 | BaO | 0–10 |
| $Na_2O$ | 24–29 | CaO | 0– 3 |
| $Li_2O$ | 3– 5 | $ZrO_2$ | 0– 2 |
| $K_2O$ | 3– 9 | ZnO | 0– 2 |
| $B_2O_3$ | 0–11 | | | and containing less than 100 p.p.m. of an oxide of the group consisting of NiO, $Fe_2O_3$, MnO, CoO and PtO and in which the total $R_2O$ ($Na_2O$, $K_2O$ and $Li_2O$) is 35–38 mol percent and the ratio $$\frac{SiO_2+2TiO_2}{R_2O}=2.0 \text{ to } 2.2$$

3. As a new composition of matter, an electroluminescent zinc sulfide-based phosphor in admixture with a vitreous enamel frit in the proportion by weight of 65% to 80% phosphor and 35% to 20% frit, said frit being suitable to embed said phosphor and bond the same to a steel enamel ground coat comprising, in a total amount of at least 85 mol percent,

| | Mol percent | | Mol percent |
|---|---|---|---|
| $SiO_2$ | 26–30 | $K_2O$ | 2– 5 |
| $B_2O_3$ | 10–23 | BaO | 0– 6 |
| $TiO_2$ | 12–21 | $Sb_2O_3$ | 0– 1 |
| $Na_2O$ | 17–22 | ZnO | 0– 9 |
| $Li_2O$ | 8–11 | $F_2$ | 0– 5 | and containing less than 100 p.p.m. of an oxide of the group consisting of NiO, $Fe_2O_3$, MnO, CoO, and PtO and in which the total $R_2O$ ($Na_2O$, $K_2O$ and $Li_2O$) is 32–35 mol percent and the ratio $$\frac{SiO_2+2TiO_2}{R_2O}=1.7 \text{ to } 2.2$$

4. An electroluminescent lamp comprising a metal base taken from the group consisting of aluminum, aluminum alloys, austenitic stainless steel, and copper, a vitreous enamel containing embedded therein 65% to 80% by weight of an electroluminescent zinc sulfide-based phosphor on said base and a light transmitting electrically conducting layer on said vitreous enamel, said vitreous enamel comprising, in a total amount of at least 85 mol percent,

| | Mol percent | | Mol percent |
|---|---|---|---|
| $SiO_2$ | 17–33 | $Sb_2O_3$ | 0–1 |
| $TiO_2$ | 20–30 | BaO | 0–10 |
| $Na_2O$ | 24–29 | CaO | 0–3 |
| $Li_2O$ | 3–5 | $ZrO_2$ | 0–2 |
| $K_2O$ | 3–9 | ZnO | 0–2 |
| $B_2O_3$ | 0–11 | | | and containing less than 100 p.p.m. of an oxide of the group consisting of NiO, $Fe_2O_3$, MnO, CoO and PtO and in which the total $R_2O$ ($Na_2O$, $K_2O$ and $Li_2O$) is 35–38 mol percent and the ratio $$\frac{SiO_2 + 2TiO_2}{R_2O} = 2.0 \text{ to } 2.2$$

5. An electroluminescent lamp as defined in claim 4 in which the light transmitting electrically conducting layer consists essentially of tin oxide.

6. An electroluminescent lamp comprising a metal base taken from the group consisting of steel, iron and non-austenitic stainless steel, a steel enamel ground coat on said metal base, a vitreous enamel containing embedded therein 65% to 80% by weight of an electroluminescent zinc sulfide-based phosphor on said steel enamel ground coat, and a light transmitting electrically conducting layer over said phosphor containing vitreous enamel layer, said phosphor containing vitreous enamel comprising, in a total amount of at least 85 mol percent,

| | Mol percent | | Mol percent |
|---|---|---|---|
| $SiO_2$ | 26–30 | $K_2O$ | 2–5 |
| $B_2O_3$ | 10–23 | BaO | 0–6 |
| $TiO_2$ | 12–21 | $Sb_2O_3$ | 0–1 |
| $Na_2O$ | 17–22 | ZnO | 0–9 |
| $Li_2O$ | 8–11 | $F_2$ | 0–5 | and containing less than 100 p.p.m. of an oxide of the group consisting of NiO, $Fe_2O_3$, MnO, CoO, and PtO and in which the total $R_2O$ ($Na_2O$, $K_2O$, and $Li_2O$) is 32–35 mol percent and the ratio $$\frac{SiO_2 + 2TiO_2}{R_2O} = 1.7 \text{ to } 2.2$$

7. An electroluminescent lamp as defined in claim 6 in which the light transmitting electrically conducting layer consists essentially of tin oxide.

References Cited in the file of this patent

UNITED STATES PATENTS 2,689,188    Hushley    Sept. 14, 1954

UNITED STATES PATENT OFFICE
CERTIFICATION OF CORRECTION

Patent No. 2,965,784                                  December 20, 1960

Lewis C. Hoffman

It is hereby certified that error appears in the above numbered patent requiring correction and that the said Letters Patent should read as corrected below.

Column 8, line 27, for "proportion of" read -- proportion by weight of --.

Signed and sealed this 25th day of July 1961.

(SEAL)
Attest:

ERNEST W. SWIDER                               DAVID L. LADD

Attesting Officer                                    Commissioner of Patents